(12) United States Patent
Ishida

(10) Patent No.: US 8,828,572 B2
(45) Date of Patent: Sep. 9, 2014

(54) PORTABLE TERMINAL DEVICE

(75) Inventor: Takefumi Ishida, Kanagawa (JP)

(73) Assignee: Panasonic Corporation, Osaka (JP)

( * ) Notice: Subject to any disclaimer, the term of this patent is extended or adjusted under 35 U.S.C. 154(b) by 294 days.

(21) Appl. No.: 13/318,940

(22) PCT Filed: Nov. 5, 2009

(86) PCT No.: PCT/JP2009/005881
§ 371 (c)(1),
(2), (4) Date: Nov. 4, 2011

(87) PCT Pub. No.: WO2010/131307
PCT Pub. Date: Nov. 18, 2010

(65) Prior Publication Data
US 2012/0045679 A1    Feb. 23, 2012

(30) Foreign Application Priority Data

May 15, 2009    (JP) .................................. 2009-118672

(51) Int. Cl.
*H01M 2/10*    (2006.01)
*H04M 1/02*    (2006.01)

(52) U.S. Cl.
CPC .......... *H04M 1/0262* (2013.01); *H01M 2/1066* (2013.01); *Y02E 60/12* (2013.01)
USPC ..................................................... 429/100

(58) Field of Classification Search
None
See application file for complete search history.

(56) References Cited

FOREIGN PATENT DOCUMENTS

| | | |
|---|---|---|
| CN | 1985384 | 6/2007 |
| JP | 1-145180 | 10/1989 |
| JP | 11-25940 | 1/1999 |
| JP | 11025940 A * | 1/1999 |
| JP | 2006-032089 | 2/2006 |
| JP | 2007-157779 | 6/2007 |
| JP | 2008-92096 | 4/2008 |
| JP | 2008-288174 | 11/2008 |
| JP | 2008288174 A * | 11/2008 |

OTHER PUBLICATIONS

U.S. Appl. No. 13/320,843 to Shinji Tomobe et al., filed Nov. 16, 2011.
Search report from China, mail date is Aug. 20, 2013.

* cited by examiner

*Primary Examiner* — Ula C Ruddock
*Assistant Examiner* — Daniel Gatewood
(74) *Attorney, Agent, or Firm* — Greenblum & Bernstein, P.L.C.

(57) ABSTRACT

A portable terminal device has a battery cover that can be opened/closed without a tool, and is small and thin, with a waterproof structure. The device has a housing with a battery pocket which houses a battery; and a battery cover which slides and opens/closes the battery pocket. The housing has a battery cover engaging section wherein a locking claw disposed on one end of the battery cover slides and is inserted such that the end of the battery cover is supported; and a packing deformation preventing/suppressing wall, which surrounds the battery pocket, except on the battery cover engaging section, and prevents a packing, integrally molded with the battery cover from deforming. The packing is integrally molded with the battery cover and a deformation preventing rib prevents the packing from deforming in the region having no packing deformation preventing/suppressing wall.

9 Claims, 6 Drawing Sheets

PORTABLE TERMINAL DEVICE

TECHNICAL FIELD

The present invention relates to improvement of a portable terminal apparatus such as a portable telephone. More particularly, the present invention relates to improvement of a waterproof structure of a battery cover of a portable terminal apparatus and the like.

BACKGROUND ART

Desirably, the housing of an electronic device such as a portable telephone has a waterproof structure so that rainwater and so on does not infiltrate inside. The housing of an electronic device is formed with, for example, a front case and a rear case of plastic, and is designed to waterproof by compressing the both cases in the direction of fitting in a state in which a waterproof packing such as a rubber O-ring intervenes between the fitting surfaces of both cases.

Patent literature 1 discloses providing a waterproof structure of a portable telephone battery cover which can slide to open and close.

Patent literature 2 discloses providing a waterproof structure of a device case which holds the first case member and the second case member by holding members and prevents the case members from deforming by the repulsion of the packing which intervenes between the fitting surfaces.

CITATION LIST

Patent Literature

PTL 1
Japanese Patent Application Laid-Open No. 11-25940
PTL 2
Japanese Patent Application Laid-Open No. 2008-92096

SUMMARY OF INVENTION

Technical Problem

However, with a conventional waterproof structure of a battery cover of a portable electronic device, since, in a lock mechanism (a locking claw) of a battery cover which opens and closes by sliding, the lock mechanism part requires a margin to slide, and the size of the portable electronic device becomes large. Also, if a margin to allow a lock mechanism part to slide is not provided to make a portable electronic device small, there is a defect that the lock mechanism part interferes with a packing deformation preventing wall. If there is a part where a packing deformation preventing wall is not formed, for the entire periphery of packing, the packing pressure of this part is not uniform and a stable waterproof cannot be achieved.

There are cases where a battery cover is opened and closed frequently to change a battery and so on. In this case, it is inconvenient to open and close a battery cover using a tool or a screw.

Taking into account the above-noted points, it is an object of the present invention to provide a portable terminal apparatus which can open and close a battery cover without a tool, which maintains a waterproof structure, and which can be made small and thin.

Solution to Problem

The portable terminal apparatus according to the present invention has a housing having a battery pocket to accommodate a battery and a battery cover to slide the battery pocket to open and close, and the housing employs a configuration to having a battery cover engaging section in which a locking claw provided on the edge of the battery cover slides and be inserted, and which supports the edge of the battery cover; a packing deformation preventing wall that is placed to surround the battery pocket except for the battery cover engaging section, and prevents a packing that is integrally molded with the battery cover from deforming; and a locking section that locks with a locking projection provided on the other edge of the battery cover; and the battery cover employs a configuration having: a locking claw that slides and is inserted to fit in the battery cover engaging section; a locking projection that is locked in the locking section; the packing; and a deformation preventing rib that prevents the packing from deforming in a region where the packing deformation preventing wall is not formed in the housing.

Advantageous Effects of Invention

The present invention makes it possible to provide a portable terminal apparatus which can open and close a battery cover without a tool, which maintains a waterproof structure, and which can be made small and thin.

DESCRIPTION OF EMBODIMENT

Now, the embodiment of the present invention will be explained in detail with reference to the accompanying drawings.

(Embodiment)

Figure 1:
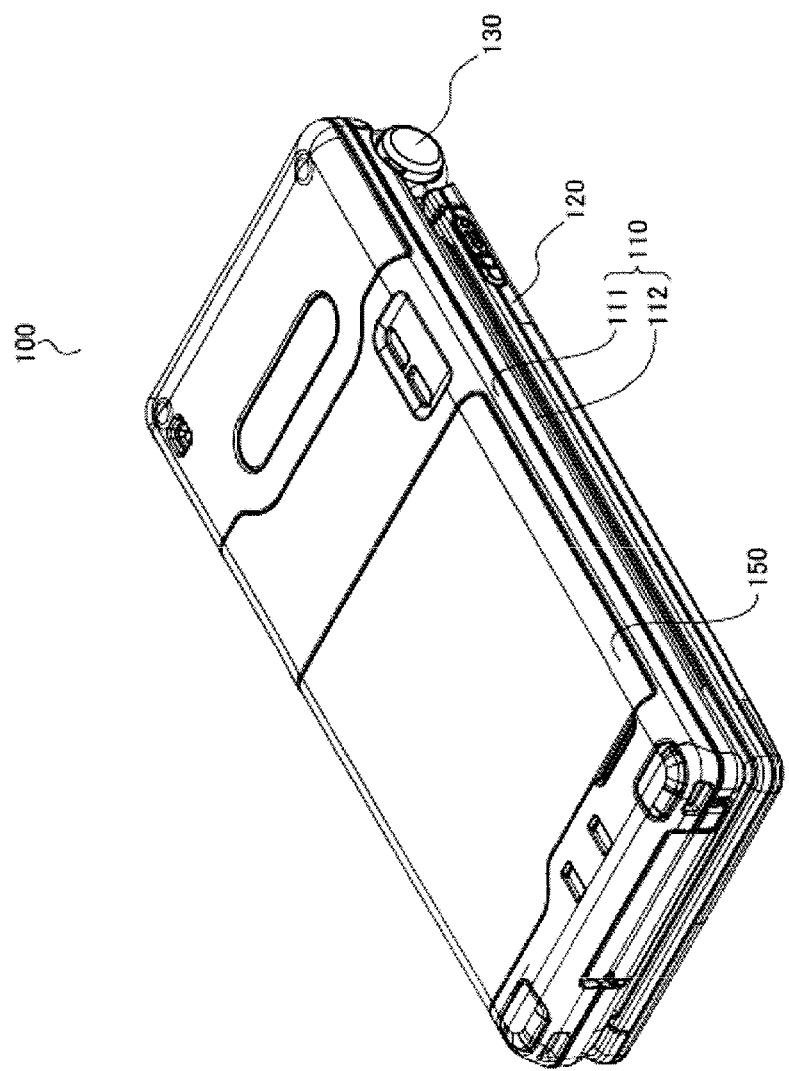
FIG. 1 is a perspective view showing the portable terminal apparatus according to the present embodiment from the back.
Figure 2:
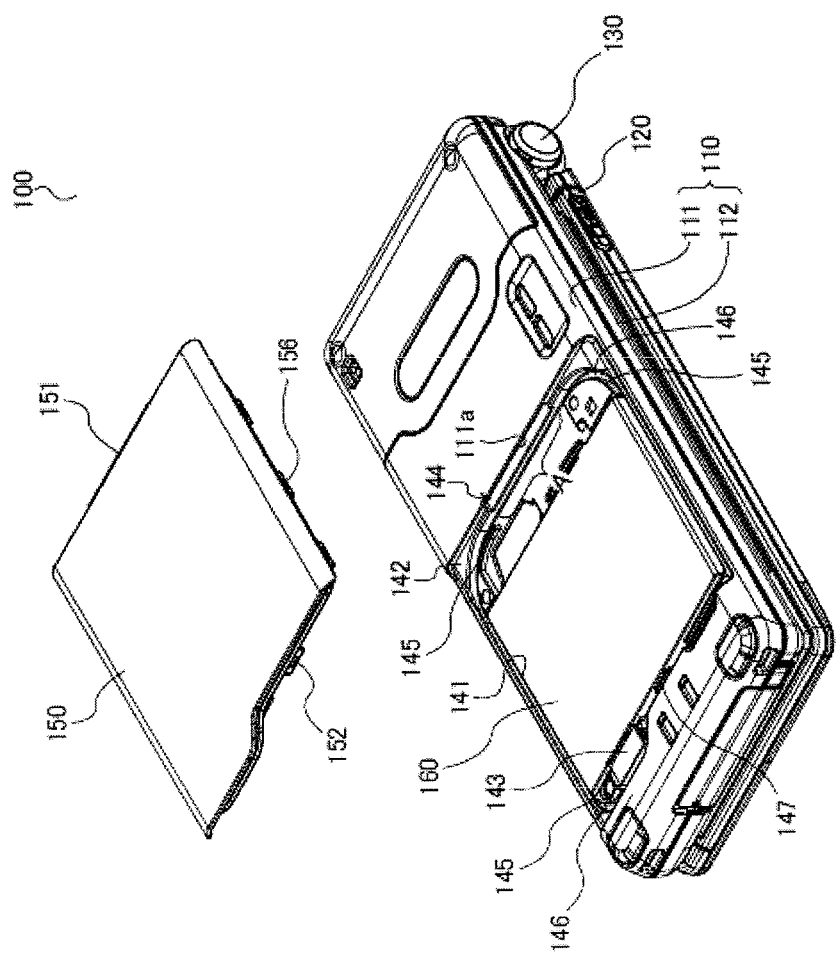
FIG. 2 is an exploded perspective view showing the portable terminal apparatus according to the present embodiment with a battery cover removed from the back.

FIG. 1 is a perspective view of the portable terminal apparatus according to the present embodiment from the back. FIG. 2 is an exploded perspective view of the above portable terminal apparatus with a battery cover removed, from the back. In this specification, the term "upward" refers to a case of viewing the back of a portable terminal apparatus as upward.

The present embodiment is an example of applying to a folding portable telephone/PHS (personal handy-phone system) as a portable terminal apparatus. Besides a folding portable telephone, the present embodiment can be applied to a portable electronic device such as a PDA (a personal digital assistant: a portable information terminal) and a portable game machine.

As shown in FIG. 1 and FIG. 2, portable terminal apparatus 100 is formed with first housing 110 having a key operation section and so on, second housing 120 having a LCD display and so on, and hinge section 130 that connects first housing 110 and second housing 120 closably.

First housing 110, second housing 120, and hinge section 130 are formed with resin molding which is an insulant, for example, non-conductive ABS resin.

The feature of the present embodiment lies in the waterproof structure of first housing 110.

First housing 110 has rear case 111 that forms the back side of portable terminal apparatus 100 and front case 112 that faces second housing 120 upon folding portable terminal apparatus 100. First housing 110, which is a flat cabinet, is formed by fitting rear case 111 and front case 112.

Rear case 111 has battery cover 150 that accommodates a battery in its lower part. Battery cover 150 is formed with a resin material having the same color and texture as rear case 111. As shown in FIG. 2, battery cover 150 has locking claw 151 to be fitted in battery cover engaging section 144 of rear case 111, and locking projection 152 to lock battery cover 150 with claw striker 147 of first housing 110 after locking claw 151 fitted in battery cover engaging section 144.

Inside first housing 110, a print substrate to provide an electronic component (not shown) and battery pocket 141 to accommodate battery 160 are formed. Battery pocket 141 is open to base section 142 that is exposed after battery cover 150 is removed, and is formed in virtually the same volume and rectangular shape as accommodated battery 160. In battery pocket 141, connection terminal socket 143 to connect with battery 160 is provided. The surface of battery 160 accommodated in battery pocket 141, base section 142, and later-described packing deformation preventing wall 145 virtually form the same flat surface.

In back section 111a of rear case 111 and base section 142 of first housing 110, battery cover engaging section 144 into which locking claw 151 of battery cover 150 slides and is inserted, is formed. Locking claw 151 formed in battery cover 150 is formed in a slightly wide convex shape so that, even if stress applies to battery cover 150, locking claw 151 does not easily deform or drop from rear case 111. Battery cover engaging section 144 into which this locking claw 151 slides and is inserted, is similarly a wide concave shape.

In base section 142 of first housing 110, packing deformation preventing wall 145 to prevent deformation of packing 153 (FIG. 3) that is integrally molded with battery cover 150, is formed to surround the outer periphery of battery pocket 141 and connection terminal socket 143. Packing deformation preventing wall 145 is formed in the upper end part of battery pocket 141, the lower end part of battery pocket 141, and the side surface of connection terminal socket 143.

Base section 142 and packing deformation preventing wall 145 of first housing 110 form frame shape packing groove 146 to surround the outer periphery of battery pocket 141 and connection terminal socket 143. That is, packing deformation preventing wall 145 forms a part of frame shape packing groove 146 to fit and seal packing 153 of battery cover 150, and has a packing deformation preventing function to prevent packing 153 from deforming.

Packing deformation preventing wall 145 is not formed in the central part of the upper part of battery pocket 141 (in the range shown as "A" in FIG. 2). This is caused by the following reasons. Battery cover engaging section 144 into which locking claw 151 of battery cover 150 is inserted, is a wide concave shape. To form this concave-shaped battery cover engaging section 144 in back section 111a of rear case 111 and base section 142 of first housing 110, it is necessary to provide a slide mechanism in a mold. Since the slide margin of this slide mechanism interferes with packing deformation preventing wall 145, packing deformation preventing wall 145 is cut in the central part of the upper part of battery pocket 141 (in the range shown as "A" in FIG. 2).

Since packing deformation preventing wall 145 has a structure having no packing deformation preventing wall 145 in the central part of the upper part of battery pocket 141 (in the range shown as "A" in FIG. 2), if not employing any measure, packing 153 (FIG. 3) of battery cover 150 bends into battery pocket 141, and, consequently, packing pressure of this part becomes ununiform and stable waterproof performance is likely not to be achieved.

The feature of the present embodiment lies in preventing the packing (FIG. 3) of battery cover 150 from deforming when employing the above packing deformation preventing wall 145.

Figure 3:
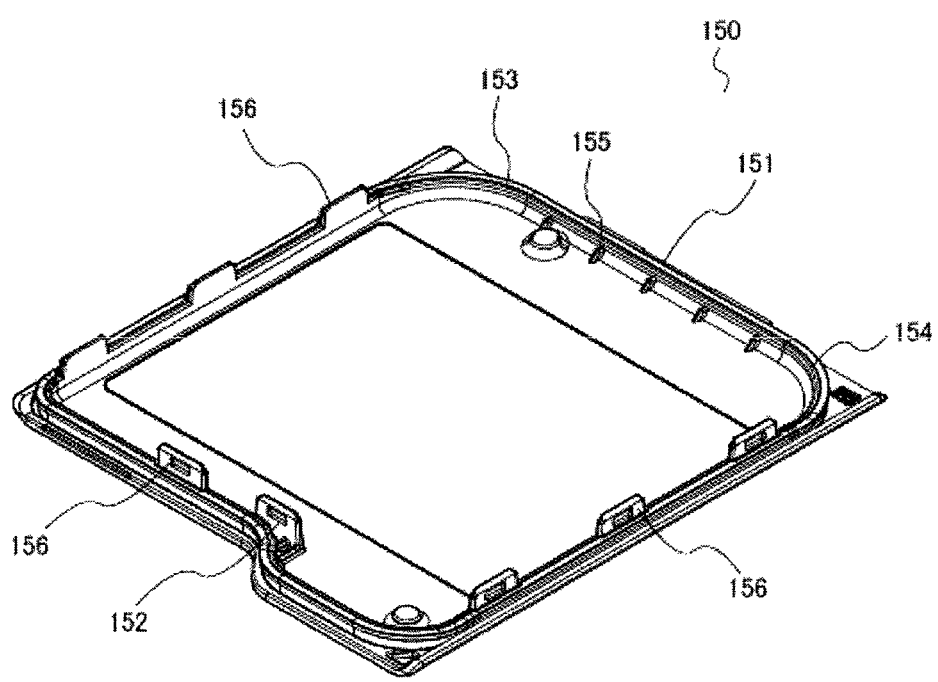
FIG. 3 is a perspective view showing a battery cover of the portable terminal apparatus according to the present embodiment, from the back.
Figure 4:
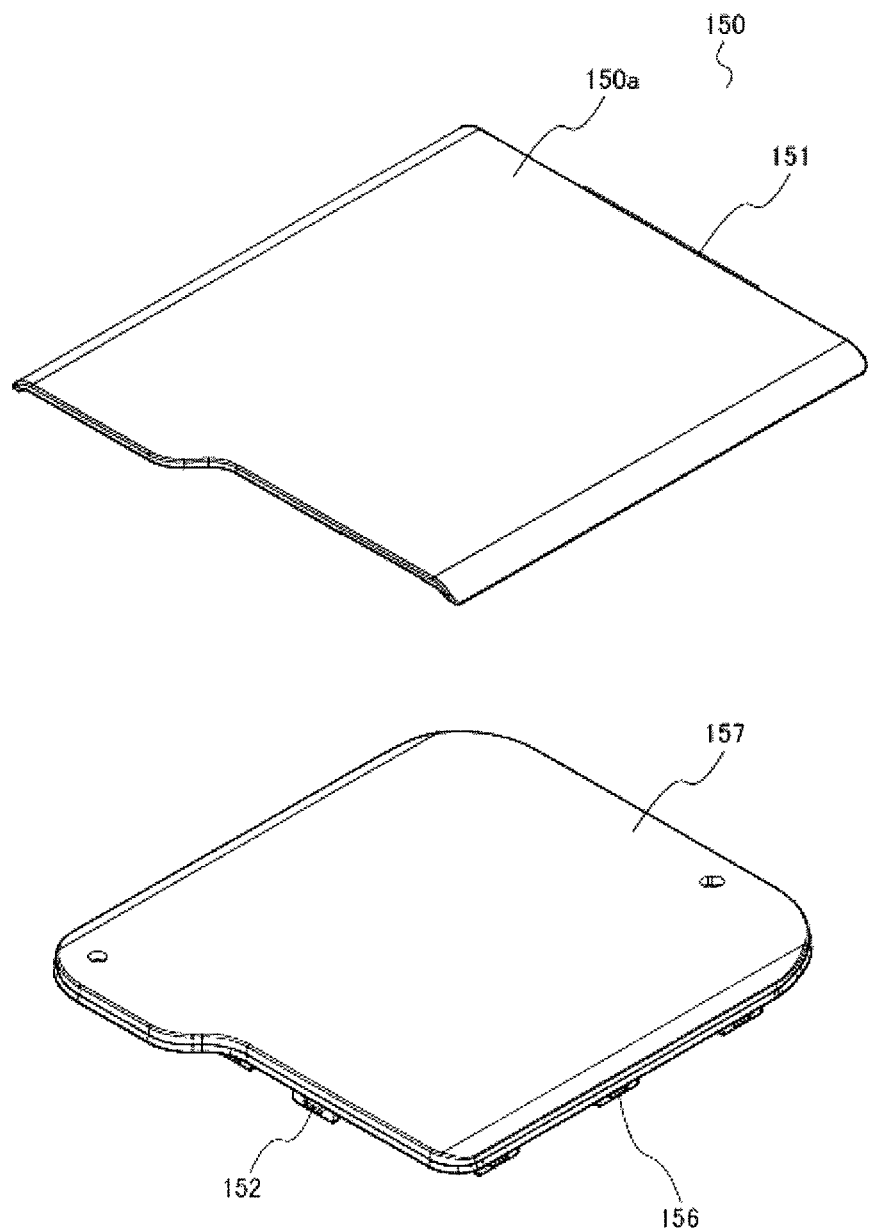
FIG. 4 is an exploded perspective view showing a battery cover from the back of the portable terminal apparatus according to the present embodiment.
Figure 5:
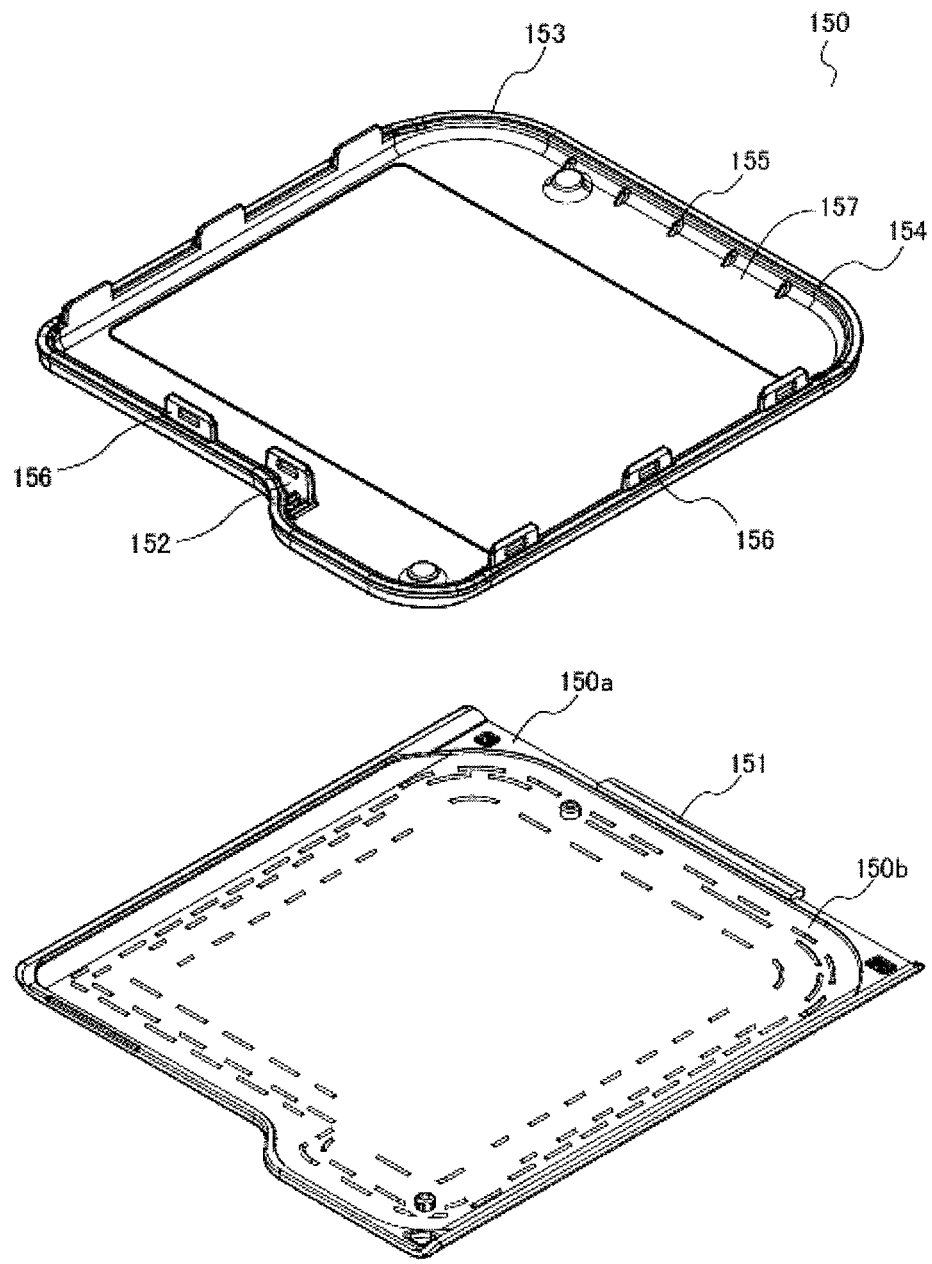
FIG. 5 is an exploded perspective view showing a battery cover of the portable terminal apparatus according to the present embodiment from the back.

FIG. 3 is a perspective view showing the above battery cover 150 from the back, FIG. 4 is an exploded perspective view showing battery cover 150 from the back of the above portable terminal apparatus 100, and FIG. 5 is an exploded perspective view showing the above battery cover 150 from the back.

As shown in FIG. 3 and FIG. 5, battery cover 150 has packing 153, attachment groove 154 to which packing 153 is attached, a plurality of deformation preventing ribs 155 that are provided adjacent to the inner periphery of attachment groove 154 and prevent packing 153 from deforming, and guide projection 156 that guides packing 153 to packing deformation preventing wall 145 and frame shape packing groove 146.

Packing 153 is fixed to attachment groove 154 by an adhesive and is integrally formed with battery cover 150.

Deformation preventing rib 155 is provided to prevent packing 153 in a region where packing deformation preventing wall 145 cannot be formed (in the range shown as "A" in FIG. 2) due to molding battery cover engaging section 144, from deforming in battery cover 150. That is, deformation preventing rib 155 provided in battery cover 150 prevents ununiformity of packing pressure of first housing 110. Desirably, deformation preventing rib 155 has the following features.

(1) A plurality of (five here) deformation preventing ribs 155 are provided in a region where packing deformation preventing wall 145 cannot be formed (in the range shown as "A" in FIG. 2). (2) Deformation preventing rib 155 has a long side in a direction in which battery cover 150 slides. (3) Deformation preventing rib 155 has a long side in a direction in which deformation preventing rib 155 crosses with packing 153. One of the above (1) to (3) or the combination of them may be employed.

As shown in FIG. 4 and FIG. 5, battery cover 150 is made by adhering plate 157 with which packing 153, attachment groove 154, deformation preventing rib 155 and guide projection 156 are integrally formed, to bottom part depression 150b of battery cover body 150a by an adhesive. Alternatively, after plate 157 with which attachment groove 154, deformation preventing rib 155 and guide projection 156 are integrally formed, is attached to bottom part depression 150b of battery cover body 150a, packing 153 may be adhered to attachment groove 154.

A method of attaching battery cover 150 of portable terminal apparatus 100 as configured above will be explained as follows.

As shown in FIG. 2, the power supply terminal of battery 160 is abut on connection terminal socket 143 and battery 160 is accommodated in battery pocket 141. Packing deformation preventing wall 145 is formed to surround the outer periphery of the upper end part of battery pocket 141, the lower end part of battery pocket 141, and the side of connection terminal socket 143. However, as described above, packing deformation preventing wall 145 is not formed in a region of battery cover engaging section 144 (in the range shown as "A" in FIG. 2). Packing deformation preventing wall 145 forms a part of frame-shaped packing groove 146 to fit and seal packing 153 of battery cover 150 between packing deformation preventing wall 145 and base section 142. The surface of battery 160 accommodated in battery pocket 141, base section 142, and later-described packing deformation preventing wall 145 virtually form the same flat surface.

In this state, locking claw 151 of battery cover 150 slides and is inserted in battery cover engaging section 144 of back section 111a of rear case 111 of first housing 110. Battery cover engaging section 144 of first housing 110 and locking claw 151 of battery cover 150 to be inserted in battery cover engaging section 144 have a wide shape of a substantial opening length (about a half length) compared to the horizontal direction length of battery cover 150, preventing deformation or drop from rear case 111 even if stress applies to battery cover 150. However, since a region of wide battery cover engaging section 144 (in the range shown as "A" in FIG. 2) is molded, packing deformation preventing wall 145 is not formed in this region.

The present embodiment provides battery cover 150 with deformation preventing rib 155 for a region where packing deformation preventing wall 145 cannot be formed (in the range shown as "A" in FIG. 2) to prevent ununiformity of packing pressure in first housing 110 by deformation preventing rib 155 provided in battery cover 150. That is, deformation preventing rib 155 prevents ununiformity of packing pressure due to the absence of packing deformation preventing wall 145 in a region of battery cover engaging section 144 (in the range shown as "A" in FIG. 2) and therefore a sufficient open length of battery cover engaging section 144 can be provided.

Figure 6:
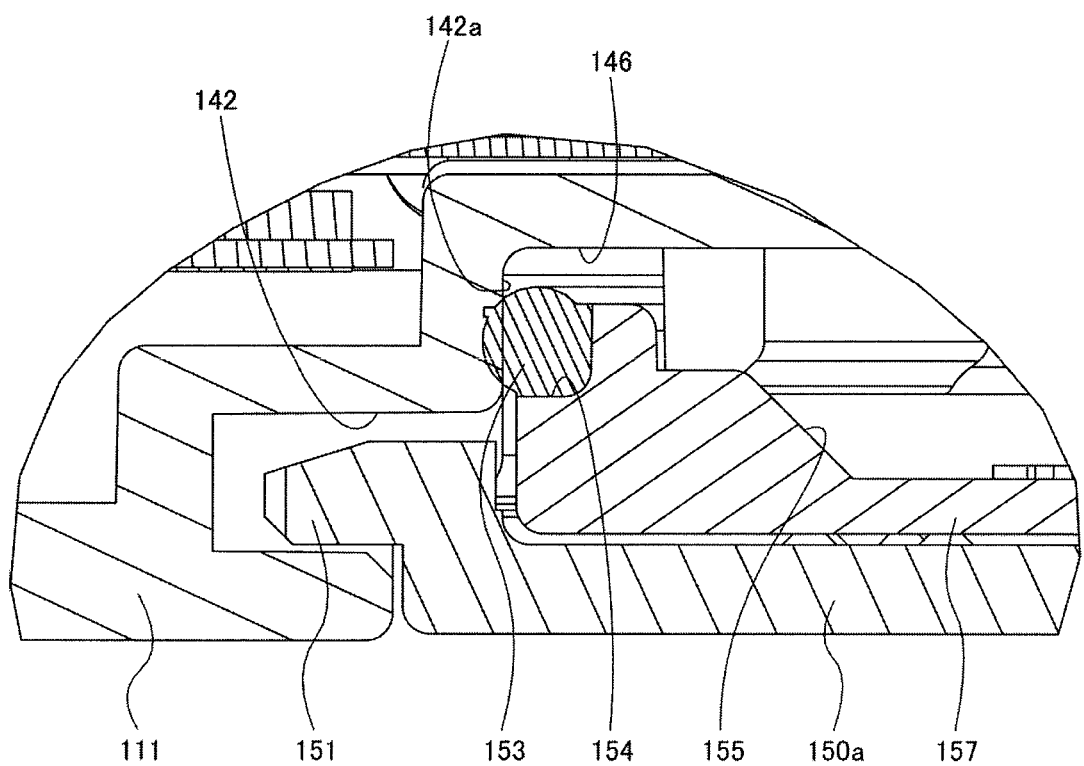
FIG. 6 is a principle-part cross sectional view of a battery cover engaging section of the portable terminal apparatus according to the present embodiment.

FIG. 6 is a principle-part cross sectional view of battery cover engaging section 144 of portable terminal apparatus 100 and shows a state in which battery cover 150 is fitted in rear case 111 of first housing 110.

As shown in FIG. 6, locking claw 151 of battery cover 150 slides and is inserted in battery cover engaging section 144 of first housing 110, and the lower part of battery cover 150 is pushed toward battery pocket 141 of first housing 110 using locking claw 151 inserted in battery cover engaging section 144 as a point of support. In attachment groove 154 of plate 157 of battery cover 150, packing 153 is integrally molded and packing 153 projects in an outer periphery direction of plate 157.

For this reason, upon pushing the lower part of battery cover 150 toward battery pocket 141 of first housing 110, packing 153 firstly abuts on base section 142 of first housing 110, elastically deforms while frictioning side surface 142a of base section 142, and moves toward frame shape packing groove 146. FIG. 6 shows a state of fitting battery cover 150 in first housing 110. As shown in FIG. 6, packing 153 is pressed in a state of being elastic-deformed.

Locking projection 152 (FIG. 2) of battery cover 150 is then locked in claw striker 147 (FIG. 2) of first housing and battery cover 150 has been attached. To remove battery cover 150 from first housing 110, locking projection 152 locked in claw striker 147 can be removed by pulling the part of locking projection 152 of battery cover 150 outward more strongly.

In a state in which battery cover 150 has been attached, packing 153 (FIG. 6) that is integrally molded with battery cover 150 is pressed against the side surface of packing deformation preventing wall 145 and the bottom part of frame shape packing groove 146 of first housing 110 that surround the outer periphery of battery pocket 141 and connection terminal socket 143 as shown in FIG. 2, and battery cover 150 is fixed.

As shown in FIG. 6, deformation preventing rib 155 provided in battery cover 150 prevents packing 153 in a region of battery cover engaging section 144 of first housing 110 where packing deformation preventing wall 145 is not formed (in the range shown as "A" in FIG. 2), from deforming to the direction of battery pocket 141 (right direction in FIG. 6). To improve waterproof property, it is preferable to press packing 153 against first housing 110 more strongly.

Packing 153 deforms to a region where packing deformation preventing wall 145 is not formed (in the range shown as "A" in FIG. 2) by bending with quite strong power. The present embodiment can prevent the above deformation completely by deformation preventing rib 155. Accordingly, battery cover 150 can be strongly pressed against first housing 110 via packing 153, so that it is possible to reliably prevent infiltration of rainwater and so on in battery pocket 141 of portable terminal apparatus 100.

As described above, according to the present embodiment, portable terminal apparatus 100 has first housing 110 having battery pocket 141 to accommodate battery 160 and battery cover 150 to slide battery pocket 141 to open and close. First housing 110 has battery cover engaging section 144 in which locking claw 151 provided on the edge of battery cover 150 slides and be inserted, and which supports the edge of battery cover 150, packing deformation preventing wall 145 that is placed to surround battery pocket 141 except for battery cover engaging section 144, and prevents packing 153 that is integrally molded with battery cover 150 from deforming, and locking striker 147 that locks with locking projection 152 provided on the other edge of battery cover 150.

Battery cover 150 has packing 153 that is integrally molded with battery cover 150 and deformation preventing rib 155 to prevent packing 153 from deforming in a region where packing deformation preventing wall 145 is not formed in first housing 110. By this means, it is possible to achieve stable packing pressure in a region where packing deformation preventing wall 145 cannot be formed due to molding battery cover engaging section 144 and certainly prevent water leak and the like.

It is possible to provide a portable electronic device which can open and close a battery cover without a tool, which maintains a waterproof structure, and which can be small and thin.

The above description is an example of a preferred embodiment of the present invention, and the present invention is by no means limited to this.

Although the above embodiment has been described as an example of applying to the portable terminal of a portable telephone as a portable terminal apparatus, the present invention is not limited to this and is equally applicable to portable information terminals such as a PDA, a personal computer or an apparatus of its fusion, further, portable devices such as a MP3 player, a HDD player, and a portable game machine.

Although the term "portable terminal apparatus" has been used with the above embodiment for ease of explanation, terms such as "waterproof structure of an electronic device" and "portable electronic device" are equally possible.

Further, anything may be employed for the shape, material, the number and the method of attaching parts forming the above portable terminal apparatus, including the connection structure of a housing, a battery cover, and a deformation preventing rib.

The disclosure of Japanese Patent Application No. 2009-118672, filed on May 15, 2009, including the specification, drawings and abstract, is incorporated herein by reference in its entirety.

Industrial Applicability

The portable terminal apparatus according to the present invention is useful to provide a waterproof structure for an electronic device that is driven by a battery such as a portable telephone. Besides a battery cover, the present invention also provides a waterproof structure for other cover part in various electronic devices.

Reference Signs List

100 PORTABLE TERMINAL APPARATUS
110 FIRST HOUSING
111 REAR CASE
112 FRONT CASE
120 SECOND HOUSING
130 HINGE SECTION
141 BATTERY POCKET
142 BASE SECTION
143 CONNECTION TERMINAL SOCKET
144 BATTERY COVER ENGAGING SECTION
145 PACKING DEFORMATION PREVENTING WALL
146 FRAME SHAPE PACKING GROOVE
147 CLAW STRIKER
150 BATTERY COVER
150 BATTERY COVER BODY
151 LOCKING CLAW
152 LOCKING PROJECTION
153 PACKING
154 ATTACHMENT GROOVE
155 DEFORMATION PREVENTING RIB
156 GUIDE PROJECTION
157 PLATE
160 BATTERY

The invention claimed is:

1. A portable terminal apparatus comprising a housing having a battery pocket to accommodate a battery, and a battery cover slidable with respect to the battery pocket to open and close the battery pocket, wherein:
the housing comprises:
a battery cover engaging section in which a locking claw, provided on an edge of the battery cover, slides and is inserted, and which supports the edge of the battery cover;
a packing deformation preventing wall that surrounds the battery pocket except in an area of the battery cover engaging section, and prevents a packing that is integrally molded with the battery cover from deforming; and
a locking section that locks with a locking projection provided on an other edge of the battery cover; and
the battery cover comprises:
a locking claw that slides and is inserted to fit in the battery cover engaging section;
a locking projection that is locked in the locking section;
the packing is integrally molded with the battery cover and prevents water infiltration into the battery pocket; and
a deformation preventing rib that prevents the packing from deforming in a region where the packing deformation preventing wall is not present in the housing.

2. The portable terminal apparatus according to claim 1, wherein the deformation preventing rib prevents the packing from deforming by bending into the battery pocket in the region where the packing deformation preventing wall is not present.

3. The portable terminal apparatus according to claim 1, wherein a plurality of deformation preventing ribs are provided in the region where the packing deformation preventing wall is not present.

4. The portable terminal apparatus according to claim 1, wherein the deformation preventing rib has a long side extending in a direction in which the battery cover slides.

5. The portable terminal apparatus according to claim 1, wherein the deformation preventing rib has a long side extending in a direction transverse to a longitudinal direction of the packing adjacent to the deformation preventing rib.

6. The portable terminal apparatus according to claim 1, the packing deformation preventing wall comprising a groove in the housing.

7. The portable terminal according to claim 1, inner and outer facing sides of the packing being configured to engage corresponding surfaces of the packing deformation preventing wall.

8. The portable terminal according to claim 1, the deformation preventing rib and the packing deformation preventing wall are configured to provide a uniform packing pressure along an entire extent of the packing.

9. The portable terminal according to claim 1, the deformation preventing rib comprising a plurality of deformation preventing ribs abutting against the packing at spaced intervals in a region where the packing deformation preventing wall of the housing is not present.

* * * * *